(12) United States Patent
Sakurai et al.

(10) Patent No.: US 7,768,737 B2
(45) Date of Patent: Aug. 3, 2010

(54) SERVO INFORMATION WRITING METHOD, MAGNETIC HEAD TESTER AND MAGNETIC DISK TESTER USING THE SERVO INFORMATION WRITING METHOD

(75) Inventors: Yoshihiro Sakurai, Ashigarakami-Gun (JP); Hitoshi Otani, Ashigarakami-Gun (JP); Kunihito Higa, Ashigarakami-Gun (JP); Yukio Yamamoto, Kokubunji (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 12/204,283

(22) Filed: Sep. 4, 2008

(65) Prior Publication Data
US 2009/0073602 A1     Mar. 19, 2009

(30) Foreign Application Priority Data
Sep. 6, 2007   (JP) ............................. 2007-231193

(51) Int. Cl.
*G11B 21/02*   (2006.01)
*G11B 5/596*   (2006.01)
*G11B 27/36*   (2006.01)
(52) U.S. Cl. .................. 360/75; 360/77.08; 360/31; 360/78.05

(58) Field of Classification Search .................. None
See application file for complete search history.

(56) References Cited

U.S. PATENT DOCUMENTS 5,998,994 A * 12/1999 Mori ........................ 324/212
6,798,610 B1 * 9/2004 Deng et al. ............... 360/78.05
7,035,039 B2   4/2006 Shitara et al.

FOREIGN PATENT DOCUMENTS

JP   10-106194   4/1998
JP   2003-272326   9/2003

* cited by examiner

*Primary Examiner*—Andrew L Sniezek
(74) *Attorney, Agent, or Firm*—Mattingly & Malur, P.C.

(57) ABSTRACT

A mark information is recorded in an area which is on a circumference of a magnetic disk corresponding to a last track in which a servo information write is ended or a track, which is one or two in front of the last track in which servo information is not written and the mark information is detected by returning a magnetic head in a radial direction of the magnetic disk by a fine movement stage after the magnetic head is moved to a next aimed track by a coarse movement stage. The servo information write position is detected by the magnetic head and the servo information is written in a servo information write position of a next track by positioning the magnetic head therein by using the fine movement stage.

12 Claims, 5 Drawing Sheets

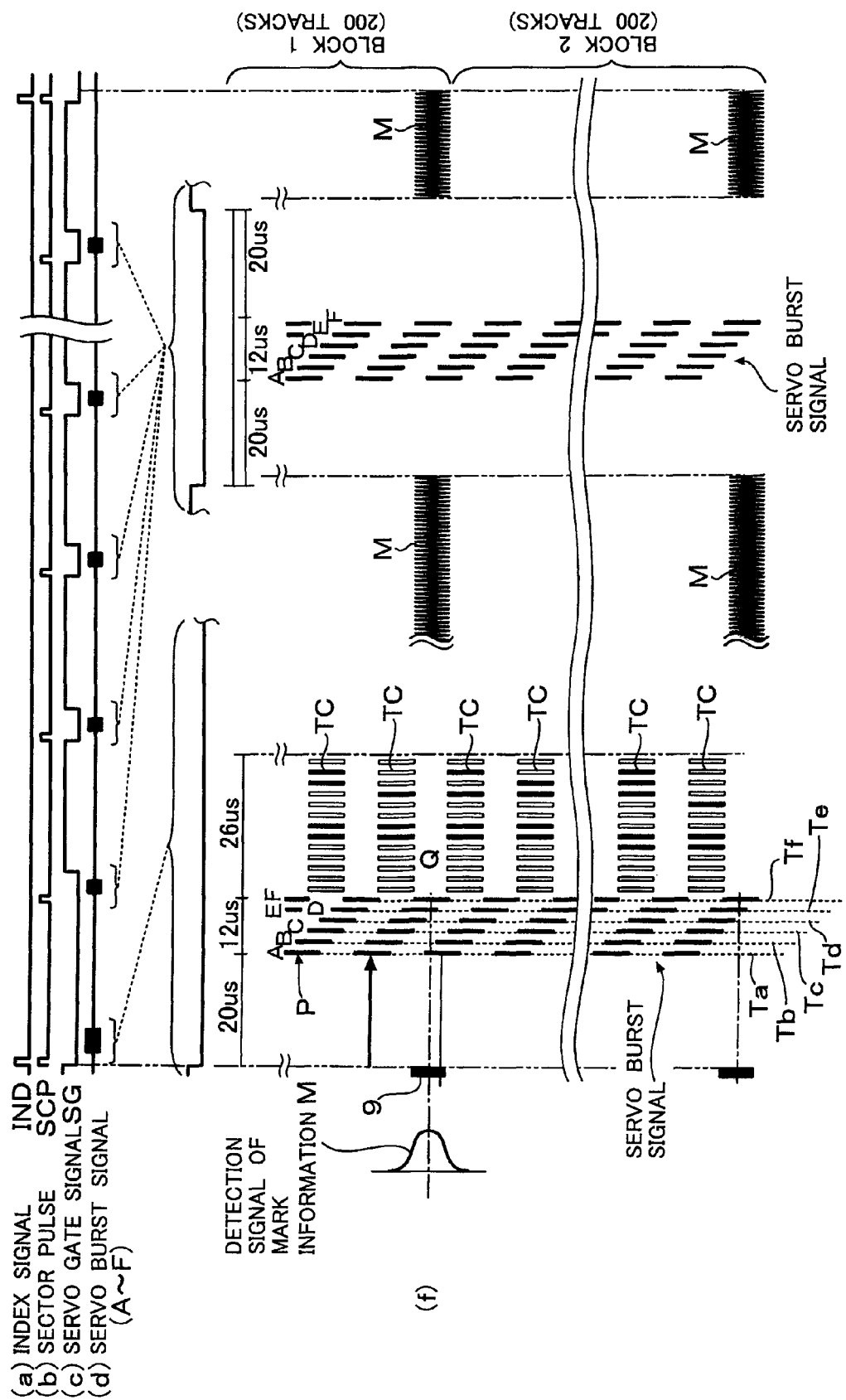

SERVO INFORMATION WRITING METHOD, MAGNETIC HEAD TESTER AND MAGNETIC DISK TESTER USING THE SERVO INFORMATION WRITING METHOD

TECHNICAL FIELD

This invention relates to a servo information writing method and a magnetic head tester and a magnetic disk tester using the same method. When servo information is continuously recorded in a magnetic disk by utilizing a coarse movement stage and a fine movement stage in a tester for testing a magnetic head or magnetic disk by writing servo information by using a sector servo system, it is necessary to write servo information in a magnetic disk every time when a magnetic head assembly (a magnetic head and a suspension spring) is exchanged. This invention relates to a servo information writing method which does not have such necessity and can improve throughput of a test processing.

BACKGROUND ART

A magnetic disk mounted on a hard magnetic disk drive (HDD) used for storing data memory of a computer system is written with servo information (servo signal) for controlling a position of the magnetic disk by a servo track writer. In the recent HDD using mini-disk, it is usual to use one or two mini-disks and use a sector servo system in which servo information is set correspondingly to tracks of each disk.

In the sector servo system, identical servo information is written in predetermined positions of every sector of each of tracks on both surfaces of one disk. The technique of this kind is described in, for example, JP-A-10-106194.

On the other hand, in a magnetic head tester and the magnetic disk tester, a magnetic head electrically functions by writing predetermined data in a track according to servo information set in a disk and reading the data according to the servo information.

As a magnetic head for HDD, a composite magnetic head having GMR head, TMR head, etc., which will be referred to MR head, hereinafter, and installed on a reading side is used recently. The recent recording density of the composite magnetic head is several tens Giga/Inch and the number of tracks exceeds 10,000/inch. Further, recent width of each track is 2.0 μm or narrower.

It is a main stream that the size of magnetic disk is mainly 3.3 inches or smaller and a glass material is used as a substrate of the magnetic disk. The HDD with using a single magnetic disk becomes popular. In such HDD, a slider having an area of a tenth part mm×1 mm is provided on a top end of a suspension spring which is 15 mm to 20 mm long. A gap between a thin film magnetic head and a disk is as close as several nm to 10 nm.

In the magnetic head tester and the magnetic disk tester which use a high density recording disk of such type, highly precise head positioning in a track is required. Therefore, a head carriage has a fine movement piezo stage for fine positioning in addition to a coarse movement stage. The magnetic head accesses a track of a magnetic disk by driving the head carriage using the coarse movement stage and the fine movement stage. This kind of head carriage and the positioning control thereof are described in detail in U.S. Pat. No. 7,035,039 corresponding to JP-A-2003-272326.

With the improvement of recording density of the magnetic disk device, it is requested to improve preciseness of head positioning in the magnetic head tester or magnetic disk tester. Further, the recent rotation speed of magnetic disk is increased to 7,200 rpm~15,000 rpm or more.

In a tester for testing a magnetic head or magnetic disk by writing servo information in the magnetic disk having current track density and recording density by using the sector servo system, it has to write the servo information in the magnetic disk every time when a magnetic head assembly is replaced.

The reason for this is that the writing position of the servo information is deviated due to variation of configuration of the magnetic head assembly.

That is, the tester has to move the magnetic head to an aimed track by the coarse moving stage and position it in a predetermined position by the fine movement stage (a piezo stage for fine positioning) and, then, to write the servo information in a predetermined track. However, the moving range of the fine movement stage is limited in a range from 100 to 200 tracks. For example, when the servo information is written in 100 to 200 tracks, the tester moves the magnetic head to next tracks by the coarse movement stage, positions it in the next tracks by the fine movement stage and then writes the servo information in the next tracks.

Due to the recent track width of several μm, variation of length of the magnetic head assembly and variation of magnetic head mounting position of the magnetic head assembly influence the writing positions of the next tracks every time when the positioning of the magnetic head in the aimed tracks is performed by the coarse movement stage.

The writing position of next tracks in which servo information is written by the magnetic head moved by the coarse movement stage and the fine movement stage and a writing gap corresponding to the track are determined correspondingly to variation of the magnetic head assembly with using the position of the coarse movement stage as a reference. Therefore, there is no consistency between the servo information thus written and servo information written by a magnetic head of another magnetic head assembly. In other words, the servo information becomes discontinuous correspondingly to variation of the configuration of the magnetic head assembly every time when a magnetic head is moved by the coarse movement stage. That is, a deviation of servo information in radial direction occurs in tracks of a magnetic disk.

So long as the same magnetic head assembly is used, there is no substantial problem in accessing the magnetic head to tracks even when the writing position of servo information is discontinuous since the combination of the fine movement stage and the coarse movement stage is unchanged. However, when a magnetic head assembly is replaced by another assembly, servo information is written in the discontinuous location due to variation of configuration of the magnetic head assembly, so that the positioning of a magnetic head of the another magnetic head assembly becomes unstable. Therefore, there is a problem that it becomes impossible to normally test a magnetic head or a magnetic disk.

As a result, the tester has to newly set servo information correspondingly to tracks by a new magnetic head every time the magnetic head assembly is replaced. However, throughput of the test of magnetic head or magnetic disk is lowered.

SUMMARY OF THE INVENTION

An object of this invention is to provide a servo information writing method which, when servo information is continuously recorded by utilizing a coarse movement stage and a fine movement stage, does not write servo information every time when a magnetic head assembly is replaced and can improve through-put of testing, and a magnetic head test device or a magnetic disk test device using the same method.

In order to achieve this object, a servo information writing method of the present invention comprising the steps of positioning a magnetic head in each of a plurality of servo information write positions by moving the magnetic head to an aimed track by a coarse movement stage and to a plurality of servo information write positions in the aimed track by a fine movement stage, writing a plurality of servo information in each of the servo information write positions and similarly a plurality of servo information for a predetermined number of tracks from the aimed track in the respective servo information write positions of a magnetic disk, moving the magnetic head to a next aimed track for every predetermined number of tracks by the coarse movement stage and writing a plurality of servo information in each of a number of tracks of the magnetic disk, wherein a predetermined information is written in an area which is on a circumference of the magnetic disk corresponding to one of a plurality of servo information write positions in a last track or a track, which is one or two front from the last track, of a predetermined number of tracks and in which servo information is not written, the predetermined information is detected by moving the magnetic head in a radial direction of the magnetic disk by the fine movement stage after the magnetic head is moved to the next aimed track by the coarse movement stage, and the servo information is written for the next aimed track by using the radial position of the magnetic head in which the predetermined information is detected as a reference.

In this invention, the predetermined information (mark information) is recorded in the area other than servo information write areas, which is on a circumference of the magnetic disk corresponding to one of a plurality of the servo information write positions in the last track or the track, which is in front of the last track by one or two, of a predetermined number of the tracks and the mark information is detected by returning the magnetic head in the radial direction of the magnetic disk by the fine movement stage after the magnetic head is moved to a next aimed track by the coarse movement stage. And, the servo information is written by positioning the magnetic head in the servo information write position of the next track by moving the magnetic head from the position at which the mark information is detected by the fine moving stage.

Incidentally, when the magnetic head is moved to the next aimed track by the coarse movement stage, it is preferable that the moving distance of the fine movement stage, which corresponds to a predetermined number of tracks, is cancelled by moving the magnetic head backward and, thereafter, the magnetic head is moved to the next aimed track by the coarse movement stage. It is preferable that, after the magnetic head is moved to the net aimed track, the servo information write position corresponding to the predetermined information is detected by reading the predetermined information by returning the magnetic head in the radial direction by the fine movement stage.

In such case, it is possible to shift the magnetic head from the track written with servo information to a next track by the fine movement stage disregarding the moving position of the coarse movement stage. That is, in this invention, it is possible to sequentially set the servo information in next tracks from a preceding servo information recording position by moving the magnetic head by only the fine movement stage.

Therefore, it is possible to remove gap difference of the servo information in the radial direction of the magnetic disk even when there is variation in configuration of the magnetic head assembly and to set such servo information in all of the tracks of the magnetic disk continuously.

As a result, it is unnecessary to write servo information in a magnetic disk every time when a magnetic head assembly is replaced and it is possible to improve through-put of the test processing of the magnetic head or the magnetic disk.

BRIEF DESCRIPTION OF THE DRAWINGS

FIG. 5 shows the servo burst signal writing method.

DESCRIPTION OF THE PREFERRED EMBODIMENTS

Figure 1:
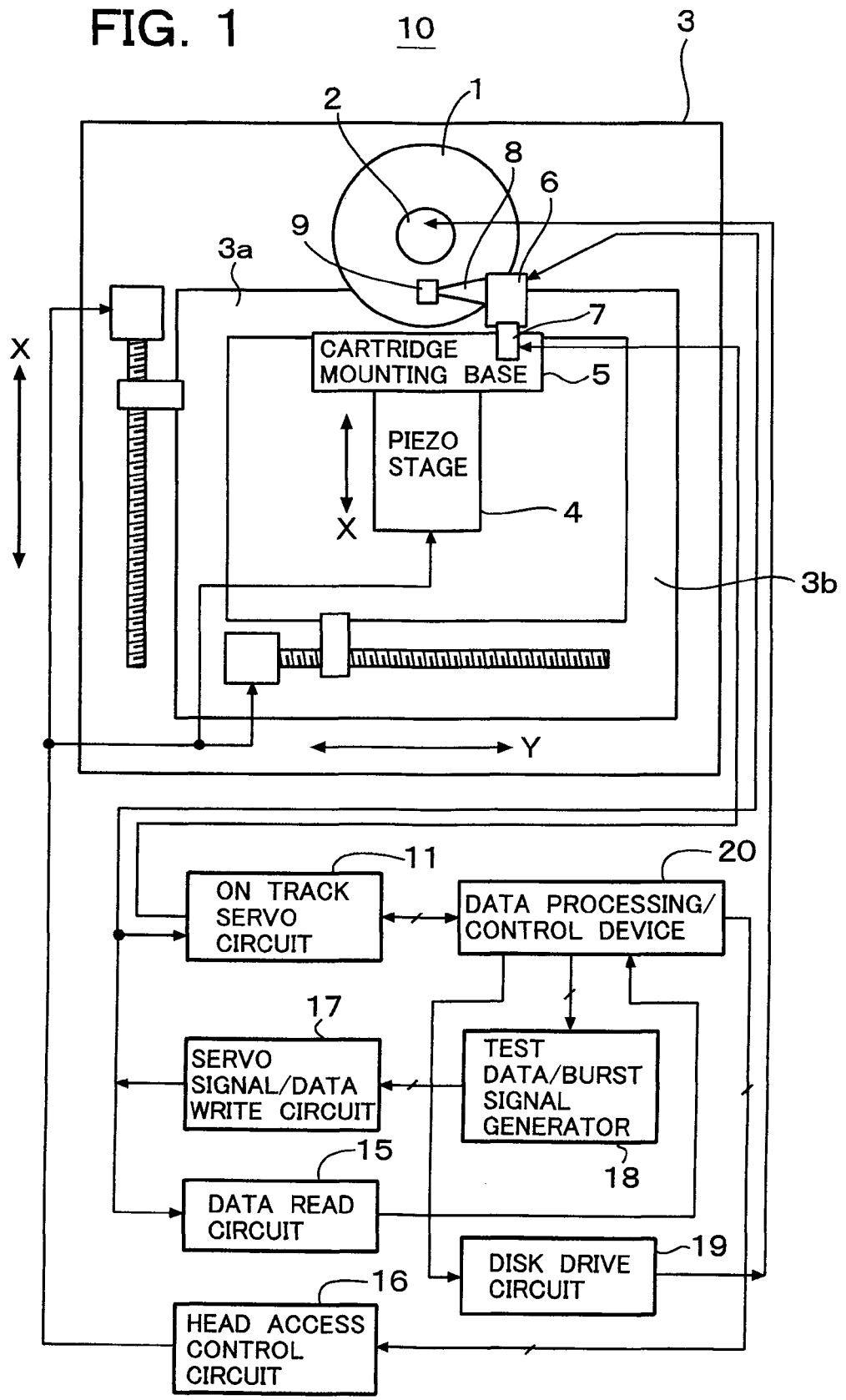
FIG. 1 is a block diagram of a magnetic head tester according to an embodiment to which the servo signal writing method of the present invention is applied.

In FIG. 1, a reference numeral 10 depicts a magnetic head tester. A reference numeral 1 depicts a magnetic disk to be tested which is detachably mounted on a spindle 2. An XY stage 3 as a head carriage is provided adjacent to the spindle 2. The XY stage 3 is constructed with an X stage 3a and a Y stage 3b.

The X stage 3a is a coarse movement stage for moving a piezo stage 4 in a radial direction (X direction) of a disk 1 with a stroke of ten-odd millimeters with distance resolution of about 15 µm.

The Y stage 3b is mounted on the X stage 3a and performs a movement for a skew regulation with respect to a magnetic head 9. On the Y stage 3b, the piezo stage 4 is mounted. A cartridge mounting base 5 of the head carriage is connected to a top end side of the piezo stage 4. As a result, when the piezo stage 4 is driven, the cartridge mounting base 5 is moved in X direction. Therefore, the head position in the X direction is finely regulated through a head cartridge 6.

Further, when a servo information is written in the magnetic disk 1, the piezo stage 4 is driven as the fine movement stage. In such case, distance resolution is about 1 nm and the stroke of the piezo stage 4 is about 150 µm.

Incidentally, the X direction coincides with a radial direction R passing through a center of the magnetic disk 1.

The head cartridge 6 is mounted on the cartridge mounting base 5 through a piezo actuator 7. The magnetic head 9 is mounted on a top end side of a suspension spring 8 and, therefore, is supported by the suspension spring 8. The magnetic head 9 is moved in the radial direction R corresponding to the X axis direction and positioned in an aimed track of the magnetic disk 1 by seeking the aimed track of the magnetic disk 1. Then, the magnetic head reads data or writes the data in the aimed track, that is, performs the so-called access operation.

When a certain track in which the magnetic head 9 exists or a specific region of the certain track, the piezo actuator 7 is controlled by an ON track servo circuit 11 shown in FIG. 1. The magnetic head 9 reads a servo burst signal (servo information) on the track in which the magnetic head is positioned. The piezo actuator 7 is controlled by the servo burst signal to put the magnetic head on the track by finely regulating the position of the magnetic head, that is, to perform a servo positioning of the ON track.

Although the piezo actuator 7 is provided outside on the head cartridge 6 in FIG. 1, it may be provided within the head cartridge 6. In such case, the piezo actuator 7 is provided in front of the suspension spring 8 such that the suspension 8 is supported rotatably or movably.

The servo positioning of the ON track is to correct a deviation of the magnetic head (deviation of the magnetic head from a center of a track) in the positioning track according to the servo signal by sequentially reading a number of servo signals which are set in the positioning track with predetermined intervals. A moving distance of the piezo actuator 7 for the correction is, for example, in the order of 1 μm or smaller. By yaw of the spindle, the servo signal positions in the magnetic disk 1 deviate in the radial direction of the magnetic disk. Therefore, the ON track servo circuit 11 supplies a small drive voltage to the piezo actuator 7 such that the magnetic head 9 is moved in the radial direction at high speed correspondingly to yaw of the spindle to pursue the track.

Figure 2:
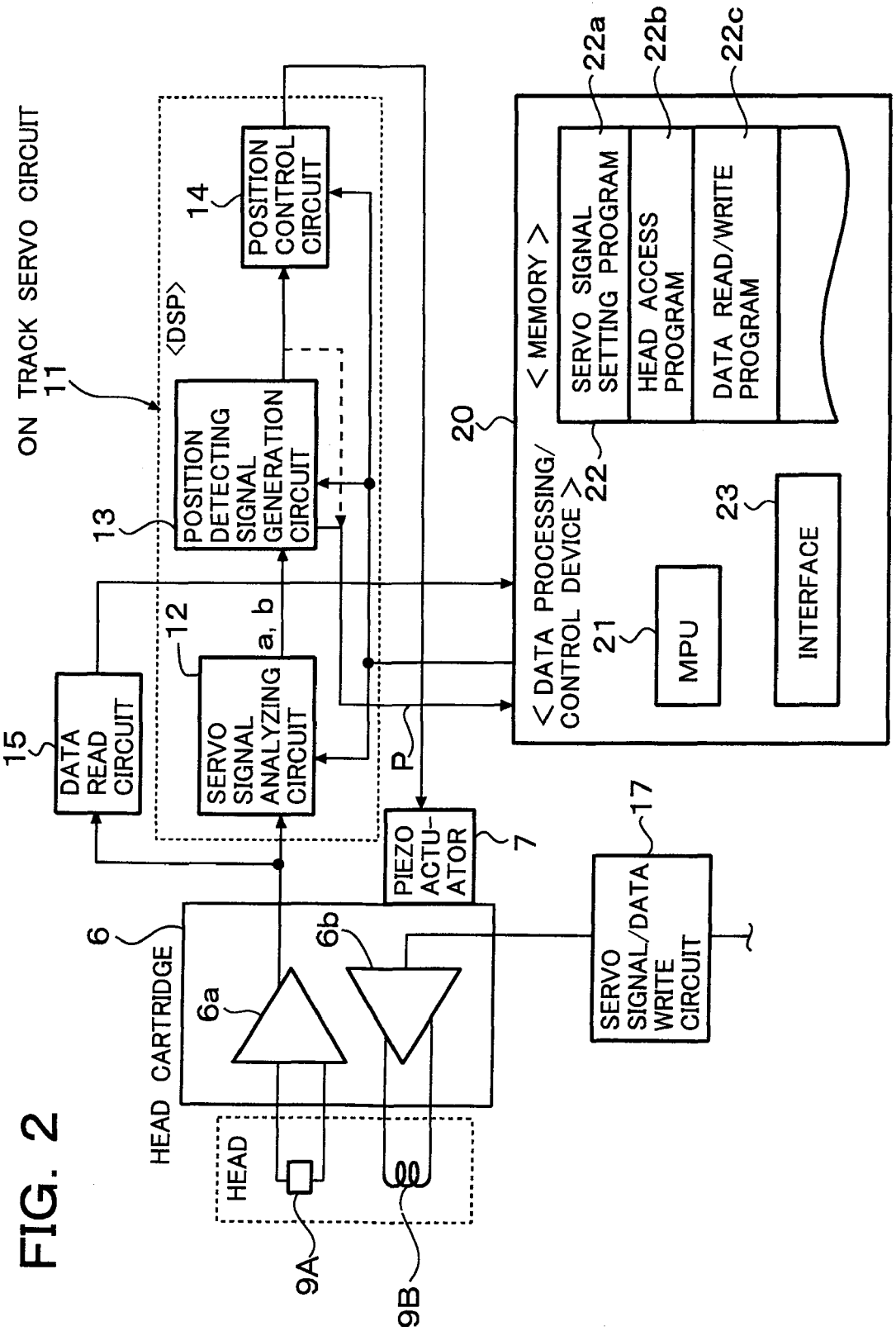
FIG. 2 is a block diagram of an ON track servo circuit shown in FIG. 1.

The head cartridge 6 detachably mounts the magnetic head 9 on the head carriage. As shown in FIG. 2, the head cartridge 6 includes a read amplifier 6a and a write amplifier 6b. The read amplifier 6a amplifies a signal from an MR head 9A and supplies the amplified signal to a data read circuit 15 (FIG. 1) and the ON track servo circuit 11.

As shown in FIG. 2, the ON track servo circuit 11 is constructed with a servo signal analyzing circuit 12, a position detecting signal generation circuit 13 and a position control circuit 14. The ON track servo circuit 11 is actuated by a data processing/control device 20.

Figure 3A:
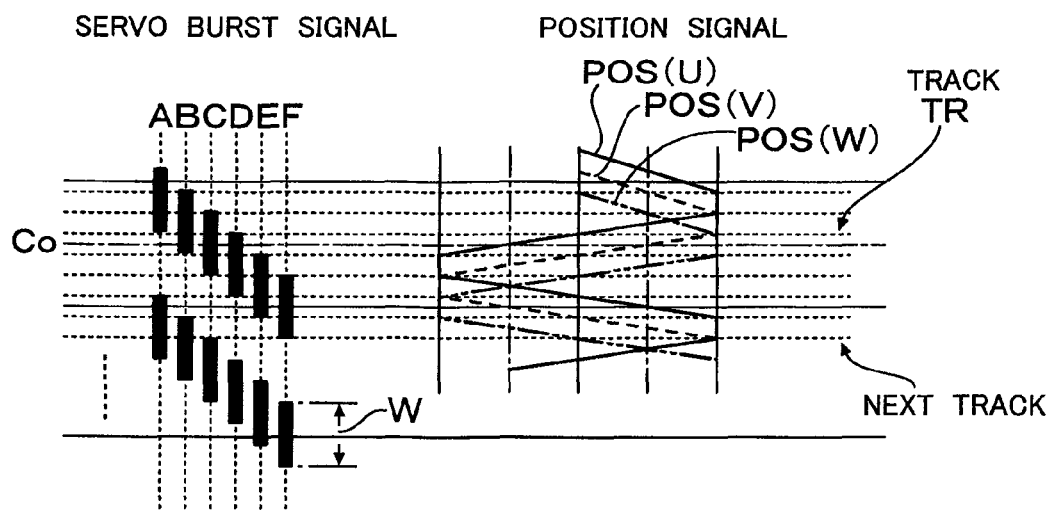
FIGS. 3(a) show servo burst signals corresponding to tracks and 3(b) show servo burst signals corresponding to a number of sectors.

The servo signal includes a servo burst signal C in a center line Co of the track TR (FIG. 3(a)), a servo burst signal B in a position deviated upward from the servo signal C by W/3, where W is a read track width, and a servo signal A in a position deviated upward from the servo signal B by W/3. Further, a servo burst signal D in a position deviated downward from the servo signal C by W/3 and a servo burst signal E in a position deviated downward from the servo signal D by W/3. Therefore, the six servo burst signals A to F are provided for each track.

As a result, the servo burst signals A, B, C, D, E and F are overlapped each other in the radial direction with 2W/3 and in the track direction with predetermined intervals and a center position of the servo burst signal F is a boarder line between adjacent tracks.

In response to the read signal from the read amplifier 6a, the servo signal analyzing circuit 12 amplifies the respective servo burst signals A, B, C. D, E and F shown in FIG. 3(a) and outputs voltage signals Va, Vb, Vc, Vd, Ve and Vf showing amplitudes of the servo burst signals.

The servo burst signals A, B, C, D, E and F are mutually deviated vertically to and horizontally in the track direction with the predetermined intervals and written in respective sectors of one track.

The servo signal analyzing circuit 12 detects the servo signals to generate the voltage signals Va to Vf corresponding to amplitude levels of the servo signals A to F with respective timings. The voltage signals Va to Vf obtained by the servo signal analyzing circuit 12 are inputted to a position detecting signal generation circuit 13.

The position detecting signal generation circuit 13 calculates three position signals shown positional deviation from the center line Co of the data track TR by using the following equations and sends the position signals to a position control circuit 14.

The position recovering circuit 13 generates the following three position signals POS(U)=(Va−Vd)/(Va+Vd), POS(V)=(Vb−Ve)/(Vb+Ve), POS(W)=(Vc−Vf)/(Vc+Vf).

As shown in a right side portion of FIG. 3(a), POS(U)=(Va−Vd)/(Va+Vd) is a signal having a negative and positive peaks corresponding to the center position of the servo signals A and D, POS(V)=(Vb−Ve)/(Vb+Ve) is a signal having a negative and positive peaks corresponding to the center position of the servo signals B and E and POS(W)=(Vc−Vf)/(Vc+Vf) is a signal having a negative and positive peaks corresponding to the center position of the servo signals C and F.

Incidentally, the position detecting signal generation circuit 13 generates track crossing signals or track position signals P from the above mentioned three position signals and supplies one or both of the signals to the data processing/control device 20.

The position control circuit 14 outputs a drive signal (voltage signal) of a predetermined level for returning the position of the magnetic head 9 to the center line Co of the track TR corresponding to the peak positions of the respective signals of the position detecting signal generation circuit 13 to the piezo actuator 7. Therefore, the position of the magnetic head 9 is corrected and the magnetic head 9 in the On stack state is positioned in an aimed track.

Incidentally, as shown by the dotted frame, the servo signal analyzing circuit 12, the position detecting signal generation circuit 13 and the position control circuit 14 are provided as a DSP circuit (digital signal processor) having the above mentioned functional circuits.

Incidentally, when the magnetic head 9 is on the center line Co of the TR track, the drive signal (voltage signal) from the position control circuit 14 is held at a constant voltage so that the position of the magnetic head 9 is held on the center line Co of the track TR.

As a result, the magnetic head 9 positioned in a certain track is dynamically positioned in the center line Co of the track TR at high speed corresponding to a response speed of the piezo actuator 7. Therefore, the magnetic head 9 can read and write data for a finely positioned track even when the disk 1 yaws.

An example of positioning of the magnetic head 9 in the center line Co of the track TR (ON track positioning) is described above. In this case, it is possible to position the magnetic head 9 in a position with a predetermined offset to the center line Co of the track TR by controlling the DSP circuit (ON track servo circuit 11) by the data processing/control device 20.

Figure 3B:
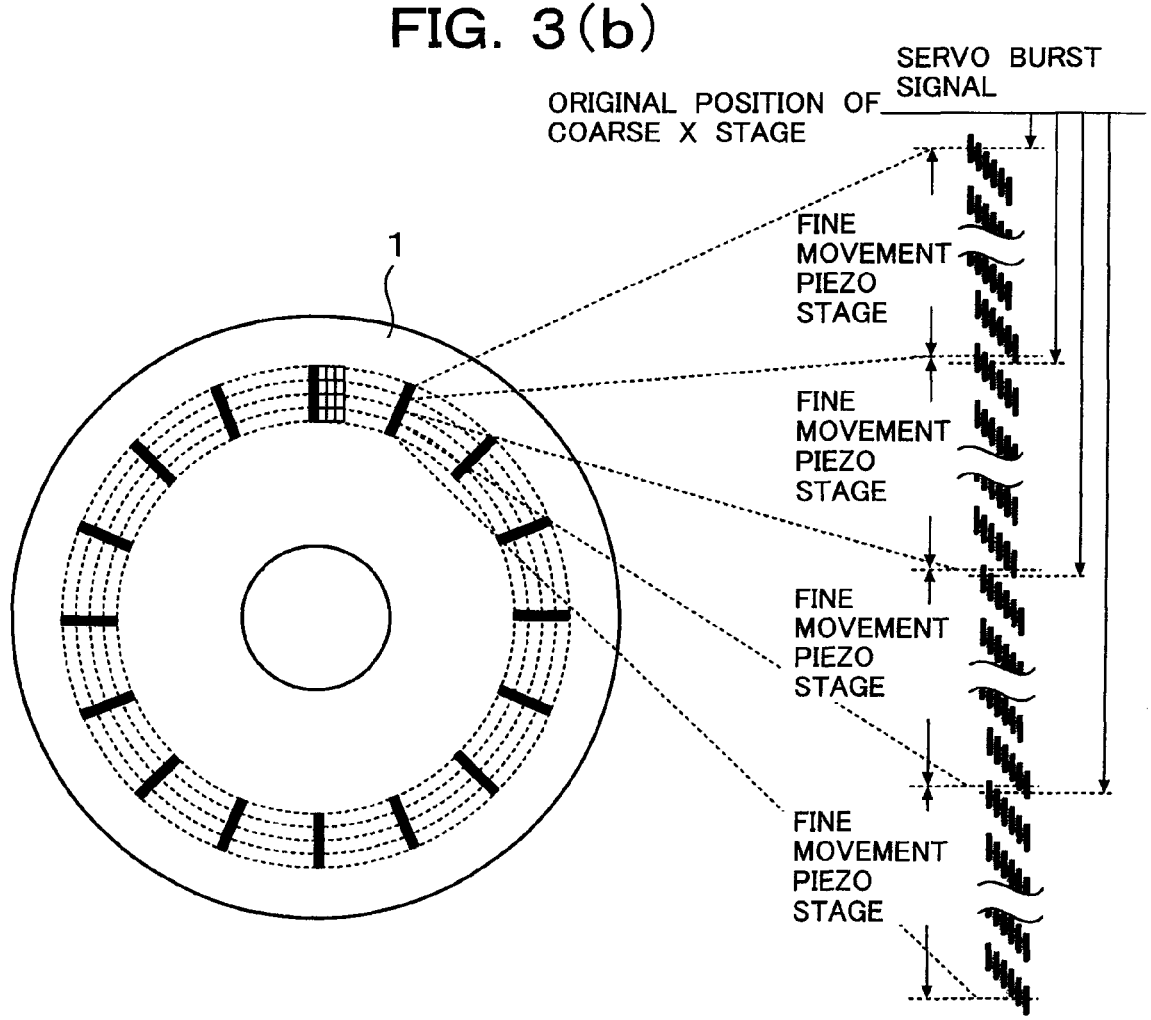

Incidentally, the disk 1 can be sectioned to a number of sectors as shown in FIG. 3(b). In this description, the number of sectors is, for example, 1024 and the servo information is set in the magnetic disk 1 by writing the servo signals A to F in the respective tracks correspondingly to the respective sector positions.

Returning to FIG. 1, a reference numeral 15 depicts a data read circuit which receives a signal from the read amplifier 6a, binarizes the read data and sends the binary read data to the data processing/control device 20. A reference numeral 16 depicts a head access control circuit by which the magnetic head 9 is positioned in a predetermined track TR which is an aimed track or in a position remote from the predetermined track TR by a constant distance by driving the XY stage 3 and the piezo stage 4, under control of a control signal from the data processing/control device 20. A reference numeral 17 depicts a servo signal/data write circuit and a reference numeral 18 depicts a test data/burst signal generator circuit. Under control of the data processing/control device 20, the test data/burst signal generator circuit 18 generates a predetermined test data or burst signal and sends the data or the burst signal to the servo signal/data write circuit 17. The servo signal/data write circuit 17 generates a write signal according to the test data or the burst signal. A write amplifier 6b (FIG. 2) of the head carriage 6 is driven by the write signal and writes the data (including test data) or servo signal in a predetermined track TR or a predetermined position through an inductive head 9B (FIG. 2) of the magnetic head 9. A reference numeral 19 depicts a disk drive circuit.

Incidentally, the write width of the servo signal of the inductive head is in, for example, a range from 300 nm to 500 nm and the read width of the servo signal of the MR head is in, for example, 200 nm to 330 nm. Although the write width of the servo signal is about 1.5 times the read width of the read signal, it can be considered that these widths are substantially the same because positions of head gap of the read head and the write head are very small. Therefore, the servo information can be set by setting a write position correspondingly to the positions of the read width of the servo signal and writing the servo signal in the write position.

Now, the write position of the servo signal will be described as the center position of the read width of the servo signal. As shown in FIG. 2, the data processing/control device 20 is constructed with an MPU 21, a memory 22, an interface 23, a CRT display and a key board, etc., which are mutually connected by a bus.

In the memory 22, a servo signal setting program 22a, a head access program 22b and a data read/write control program 22c, etc., are stored It is assumed that a track width of the track TR and the read width of the servo signal shown in FIG. 3(a) are 0.6 μm and 300 nm, respectively. As shown in a right side portion of FIG. 3(b), the MPU 21 executes the servo signal setting program 22a. The coarse moving X stage 3a is driven to move the magnetic head 9 from an original point position to a first track position as an aimed track and then positions the magnetic head 9 in a first servo information write position of the initial track by the piezo stage 4. Next, the MPU 21 drives the piezo stage 4 to sequentially write the servo signals A to F corresponding to 200 tracks from the aimed track position.

After the servo signal for 200 tracks are set, the MPU 21 returns the coarse X stage 3a to the original point position and drives the coarse X stage 3a with using a position which is remote from the initial aimed track position by a distance of 2 pitches (1 pitch is 60 μm) as a next aimed track position to move the magnetic head 9 in radial direction of the magnetic disk. And then, the piezo stage 4 is driven to set the servo signal in next 200 tracks.

Incidentally, the original point position to which the coarse X stage 3a is returned may be a position in which the servo signal is written in the first aimed track.

In this manner, the MPU 21 writes servo signals by moving the coarse X stage 3a by adding 120 μm to the next aimed track position and then moving the piezo stage 4 thereto. By performing a servo signal writing by adding every 200 tracks as a unit, the servo information is written in the disk 1.

In order to write a servo signal for the next aimed track to which the coarse X stage 3a is to be moved by such servo signal write control, the MPU 21 moves the magnetic head 9 to a write position of servo signal in immediately front of track, in which the servo signal is written, by the piezo stage 4. Then, by using this position as a reference, the magnetic head 9 is moved in radial direction of the magnetic disk 1 by the piezo stage 4 and positioned in the servo information write position of a next aimed track to write the servo signal therein. Thus, the gap deviation of the servo signal in the radial direction of the magnetic disk and discontinuity of the servo signals of the tracks of the magnetic disk 1 are prevented.

The write of servo signal will be described.

Incidentally, the servo signal write of next 200 tracks by the piezo stage 4 of the MPU 21 is performed sequentially after the servo information writing of the next aimed track.

Figure 4:
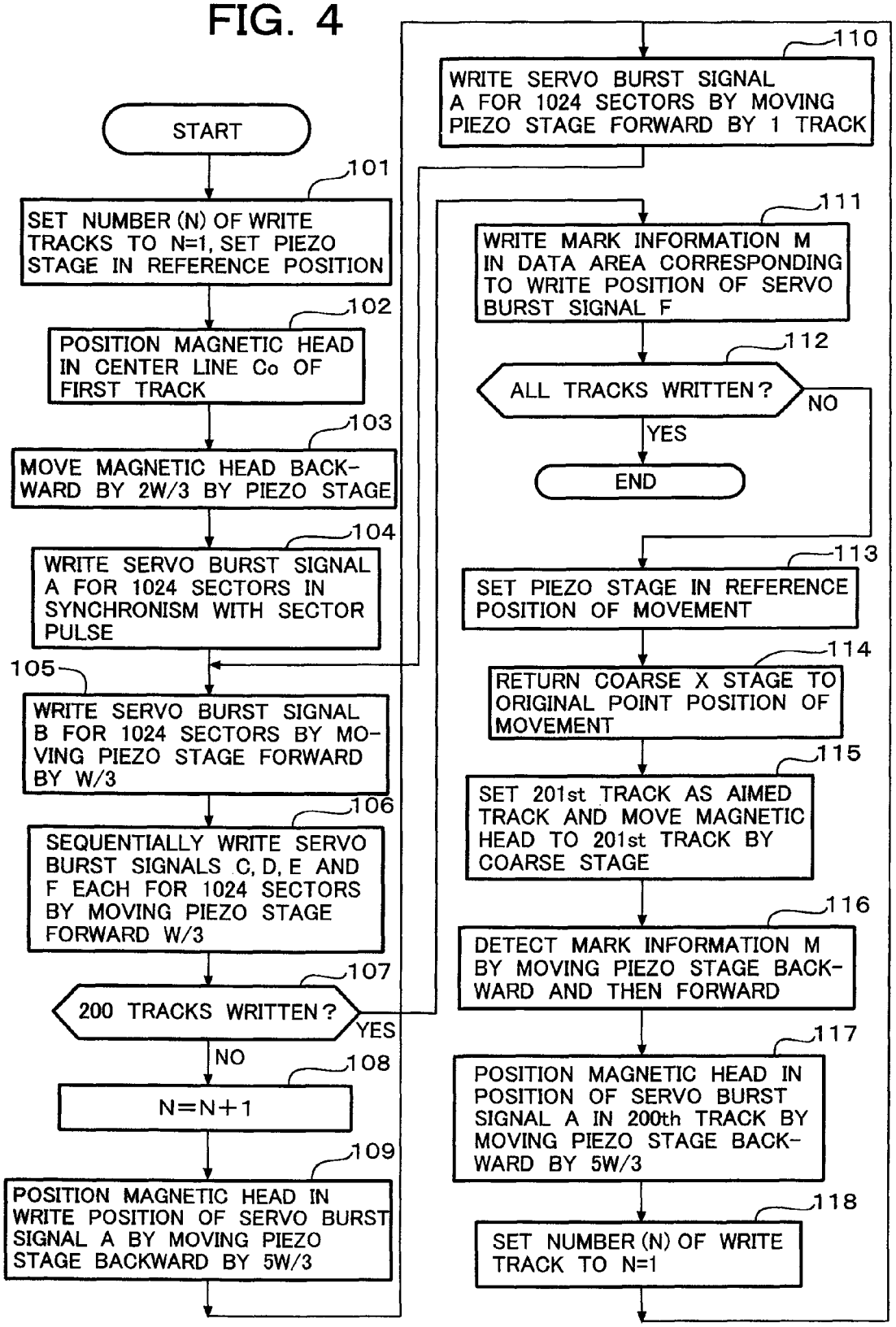
FIG. 4 is a flowchart of a writing processing of servo burst signal.

FIG. 4 is a flowchart of the servo signal writing processing and FIG. 5 shows a writing method of servo burst signal.

In FIG. 5, FIG. 5(a) shows an index signal IND, FIG. 5(b) shows a sector pulse SCP, FIG. 5(c) shows a servo gate signal SG and FIG. 5(d) shows a servo signal read out in a period "L" of the servo gate signal SG. FIG. 5(f) shows the servo signal in detail.

Incidentally, the sector pulse SCP is produced by dividing the period of the index signal IND by 1024. The servo gate signal SG is generated by the index signal IND and the sector pulse SCP.

In FIG. 4, the MPU 21 sets the number (N) of writing tracks to 1 (N=1) as an initial value and sets the piezo stage 4 in a reference movement position (Step 101). The reference movement position of the piezo stage 4 has a forward movable stroke of about 150 μm and a backward movable stroke about several tracks (about 2 to 3 μm).

Next, the MPU 21 drives the coarse X stage 3a in the original point position to move the magnetic head 9 to an aimed track. Then, the MPU 21 drives the piezo stage 4 to position the magnetic head 9 in the center line Co of the first track (aimed track) of the first 200 servo signal write blocks (Step 102). Then, the MPU 21 moves the magnetic head 9 backward by a distance corresponding to 2W/3 (W is a read width of servo signal, 2W/3=200 nm) in the disk radial direction by the piezo stage 4 (Step 103). In this position, the MPU 21 writes servo signal A for 1024 sectors (=one track) by the magnetic head 9 in a first write timing position Ta (refer to FIG. 5(f) in synchronism with the sector pulse SCP (Step 104).

The write timing Ta is after 20 μsec from the rising of the each sector pulse SCP as shown in FIG. 5(f).

Incidentally, the MPU 21 writes a track code TC (not shown) with a period of 20 μsec from the rise of the sector pulse SCP by the magnetic head 9 in synchronism with the sector pulse SCP in the position of the index signal IND.

Since the positions of head gap of the read head and the write head are identical, the servo signal writing will be described for the movement of the read head width W.

In response to a next index signal IND, the piezo stage 4 is moved forward by W/3 (=100 nm) in the disk radial direction to move the magnetic head 9 and write a servo signal B for 1024 sectors (=1 track) at a next writing timing Tb (refer to FIG. 5(f)) (Step 105). The write timing Tb is at a position Ta+2.4 μsec.

In this manner, the MPU 21 sequentially moves the piezo stage 4 forward by W/3 in radial direction of the magnetic disk to move the magnetic head 9 to the write timing position Tc-Tf (refer to FIG. 4) and sequentially writes the servo signals C, D, E and F each for 1024 sectors (Step 106).

Then, the MPU 21 determines whether or not the write of servo signal for 200 tracks is ended (Step 107) and, when NO, the track number N is updated to N+1 (Step 108).

The MPU 21 moves the piezo stage 4 backward by 5W/3 (=500 nm) in the radial direction of the magnetic disk to move the magnetic head 9 such that it is returned to the write position of the servo signal A and positioned therein temporarily (Step 109). Therefore, the MPU 21 moves the piezo stage 4 forward by 1 track (=600 nm) to move the magnetic head 9 to the write position of the first servo signal A of the next track. And, then, the servo signal A for 1024 sectors is written by the magnetic head 9 in the first write timing position Ta as mentioned previously (Step 110). Then, the MPU 21 is returned to Step 105 and writes the servo signals B to F for 1024 sectors in Steps 105 and 106.

Incidentally, in Step 109, the piezo stage 4 is moved backward by 5W/3 in the radial direction of the magnetic disk to move the magnetic head 9 and, then, is moved for 1 track in Step 110. This is to reduce the accumulation error. However, it may be possible to move the piezo stage 4 forward from the position of the servo signal F directly in the radial direction of magnetic disk by W/3 (=100 nm) to move the magnetic head 9 to the write position of the first servo signal A of the track, without positioning by the backward movement for 5W/3 (=500 nm). In such case, the processing in Step 110 is to write the servo signal A for 1024 sectors in the first write timing position Ta of the servo signal A.

Incidentally, the write position of the servo signal A in Step 109 may be set by not moving the magnetic head 9 backward by 5W/3 (=500 nm) in the disk radial direction but preliminarily storing the write position (on the disk) of the servo signal A in a memory and returning to the write position stored in the MPU 21.

When the write of servo signals A to F for 200 tracks is completed, the determination in Step 107 becomes YES. In this state, the magnetic head 9 is on a circumference of a position Q between tracks in radial direction in which the servo signal F of the last 200th track is written. The MPU 21 writes the mark information M indicating the write position of the last servo signal in a region in which servo signal F is not set on the circumference of the magnetic disk 1, on which the servo signal F is set, for example, a data region, and records it (refer to Step 111/FIG. 5(f)).

Incidentally, the mark information M can be written in any region other than the write area of the servo signal. However, when the track code TC is written, such area should not be used.

Then, the MPU 21 determines whether or not all of the track servo signals are written (Step 112). When NO, the MPU 21 returns the fine movement piezo stage 4 to the reference position (Step 113) and returns the coarse movement stage to the original point position (Step 114).

The operation of returning the piezo stage 4 to the reference position is executed by canceling a moving distance of the fine movement stage corresponding to the 200 tracks to hold the moving stroke thereof.

Next, the MPU 21 moves the stage from the reference position by a distance corresponding to next aimed tracks (in this case, 201 tracks=120 μm+α=2 pitches+α) and sets the stage in a top track (next aimed track) of a next servo signal write block, where α is a distance from the original point position to the initial aimed track position (Step 115).

The MPU 21 moves the piezo stage 4 backward by one track, reads the data by the head 9 while moving the piezo stage forward and detects the mark information M in the Q position in the radial direction (position on the circumference between tracks (refer to FIG. 5(f)) (Step 116).

Then, the MPU 21 moves the piezo stage 4 backward from the Q position by 5W/3 (=500 nm) in the disk radial direction to return the magnetic head 9 to the position P (refer to FIG. 5(f)), in which the servo signal A of the last track of the 200 tracks, and positions the piezo stage therein temporarily (Step 117).

Then, the MPU 21 updates the track write number N to N=1 as the initial value (Step 118) and, then, returns to Step 110. In Step 110, the piezo stage 4 is moved forward by 1 track (=600 nm) in the disk radial direction to move the initial servo signal A of the initial tracks to the write position of the initial servo signal A of the next track. Then, the initial servo signal A of the next track is written in the first write timing position Ta of the initial servo signal A of the next track and returns to Step 105 to write the and servo signals B to F for the next tracks through Step 106.

Thereafter, the MPU 21 repeats similar processing to set the servo signals A to F in all of the tracks of the disk 1.

When the servo signals are set in this manner, the magnetic head tester 10 enters into the magnetic disk test.

Returning to FIG. 2, the MPU 21 executes the head access program 22b and receives a track traversing signal (or track position signal P) from a position detecting signal generation circuit 13 through the interface 23. In response to the track traversing signal, the control signal is sent to the head access control circuit 16 shown in FIG. 1 to control the X stage 3a and the Y stage 3b of the XY stage 3 to thereby position the magnetic head 9 in the aimed track TR. Further, the control for positioning the magnetic head 9 in the aimed track TR is performed by finely regulating the position in the X direction by driving the piezo stage 4.

Incidentally, when the positioning of the magnetic head in the radial direction R is performed by the track position signal P, the positioning information (track code TC) indicating the track position is stored in tracks of the magnetic disk 1 preliminarily according to the track position, as described previously. The positioning information can be set in the servo signal position.

When the magnetic head 9 is positioned in the aimed track TR, the test data read or write operation is performed by the magnetic head 9. In such case, the MPU 21 executes the data read/write control program 22c and enters into the data read control or the data write control after the access of the track TR in which the head is positioned is performed by rotating the magnetic disk (1+⅓) rotations and the data read/write is performed continuously. The data read or data write in this case is performed by the ON track servo circuit 11 under the ON track positioning control (ON track servo control).

As described hereinbefore, in this embodiment, the moving distance of the fine movement stage for predetermined tracks is cancelled by returning it to the reference position thereof. And, thereafter, the coarse movement stage moves the magnetic head to the next aimed track. Further, the fine movement stage detects the mark information M (predetermined information) by the magnetic head by returning the magnetic head in the radial direction of the magnetic disk and moving it forward in the radial direction. However, the present invention is not limited to this processing and the mark information M can be read by moving the magnetic head forward and backward in the radial direction of the magnetic disk by moving the coarse movement stage and the fine movement stage.

Further, in this embodiment, although the mark information M is written in the area other than the servo signal write area on the circumference of the magnetic disk corresponding to the last servo signal write position in the last track of the predetermined number of tracks, the recording of the mark information M can be performed in any servo signal write position of any track before a track which can be detected by the fine movement stage. However, it is preferable that the servo signal write position is the last track or a track preceding the last track by one or two tracks.

Even when the write position of the mark information M (predetermined information) precedes a next track by about 3 tracks, this invention is applicable since the positioning error to the next track is small. Therefore, in this invention, although the write position of the mark information M is not limited to the last servo signal write position of the last track, the write position of the mark information M (predetermined information) preceding a next track by more than 3 tracks is not preferable since the error becomes large at present.

Therefore, the detection of the mark information (predetermined information) in this invention is performed by returning the magnetic head to the last track for which the write of the servo information is ended or a track preceding the last track by 1 or 2 tracks and then moving the magnetic head in a direction to the next track.

Further, the piezo stage 4 of this embodiment is not limited to the piezo actuator and may be a finely movable actuator forward and backward or other forward/backward actuator. Further, the X stage and the Y stage in this embodiment can be reversed. In this invention, it is possible to provide one of these stages in the radial direction of the disk.

Further, in this embodiment, although the magnetic head tester is mainly described, this invention can be applied to a magnetic disk tester as a matter of course.

The invention claimed is:

1. A servo information writing method for writing servo information in a magnetic disk, comprising the steps of positioning a magnetic head in each of a plurality of servo information write positions by moving the magnetic head to an aimed track by a coarse movement stage and to a plurality of servo information write positions in the aimed track by a fine movement stage, writing a plurality of servo information in each of the servo information write positions and similarly a plurality of servo information for a predetermined number of tracks from the aimed track in the respective servo information write positions of a magnetic disk, moving the magnetic head to a next aimed track for every predetermined number of tracks by the coarse movement stage and writing a plurality of servo information in each of a number of tracks of the magnetic disk, wherein
   a predetermined information is written in an area which is on a circumference of the magnetic disk corresponding to one of a plurality of servo information write positions in a last track or a track, which is one or two in front of the last track, of a predetermined number of tracks and in which servo information is not written,
   the predetermined information is detected by moving the magnetic head in a radial direction of the magnetic disk by the fine movement stage after the magnetic head is moved to a next aimed track by the coarse movement stage, and
   the servo information is written for the next aimed track using the radial position of the magnetic head, in which the predetermined information is detected, as a reference.

2. A servo signal writing method claimed in claim 1, wherein the detection of the predetermined information is performed by reading the predetermined information by returning the magnetic head, by the fine movement stage, toward the predetermined number of tracks in which the servo information is written in the radial direction of the magnetic disk and the magnetic head is moved from a reference position from which the predetermined information is read to a servo information write position of the next aimed track.

3. A servo signal writing method claimed in claim 2, wherein the detection of the predetermined information is performed by reading the predetermined information by returning the magnetic head, by the fine movement stage, to the last track or a track, which is one or two front from the last track, of the predetermined number of tracks in which the predetermined information is written.

4. A servo signal writing method claimed in claim 3, wherein the predetermined information is written on a circumference of the magnetic disk corresponding to one of a plurality of servo information write positions of the last track.

5. A servo signal writing method claimed in claim 4, wherein the predetermined information is written in the circumference of the magnetic disk corresponding to a last servo information write position of the last track and the servo information write for the next aimed track is performed by positioning the magnetic head from the last servo information write position in a first servo information write position of the next aimed track.

6. A servo signal writing method claimed in claim 5, wherein the write of the servo information in the next aimed track is performed by positioning the magnetic head in a first servo information write position in the next aimed track by moving the magnetic head from the last servo information write position to a first servo information write position in the last track and moving the magnetic head by a distance corresponding to one track in the radial direction.

7. A servo signal writing method claimed in claim 6, wherein a stroke of the fine movement stage is the predetermined number of tracks or more and the movement of the magnetic head to the next aimed track by the coarse moving stage is performed by using an original point position which is a movement reference of the coarse moving stage.

8. A servo signal writing method claimed in claim 7, wherein six servo information of the plurality of servo information are sifted each other by $1/3$ of a track width of a read head in the radial direction and allocated to one track.

9. A magnetic head tester for testing a magnetic head, comprising a positioning means for positioning a magnetic head in each of a plurality of servo information write positions by moving the magnetic head to an aimed track in a magnetic disk by a coarse movement stage and to a plurality of servo information write positions in the aimed track by a fine movement stage, and a writing means for writing a plurality of servo information in each of the servo information write positions and similarly a plurality of servo information for a predetermined number of tracks from the aimed track in the respective servo information write positions of the magnetic disk, the positioning means moving the magnetic head to a next aimed track for every predetermined number of tracks by the coarse movement stage and the writing means writing a plurality of servo information in each of a number of tracks of the magnetic disk,
   wherein
   the writing means writes a predetermined information in an area which is on a circumference of the magnetic disk corresponding to one of a plurality of servo information write positions in a last track or a track, which is one or two in front of the last track, of a predetermined number of tracks and in which servo information is not written,
   the predetermined information is detected by moving the magnetic head in a radial direction of the magnetic disk by the fine movement stage after the magnetic head is moved to a next aimed track by the coarse movement stage,
   the writing means writes the servo information for the next aimed track using the radial position of the magnetic head, in which the predetermined information is detected, as a reference, and
   the magnetic head is tested by positioning the magnetic head in a predetermined track.

10. A magnetic head tester for testing a magnetic head, according to claim 9, further comprising a control circuit for positioning the magnetic head in the predetermined track by an ON track servo control according to the servo information which is read by the magnetic head, wherein the magnetic head is tested by positioning the magnetic head in the predetermined track by the control circuit in an ON track servo control.

11. A magnetic disk tester for testing a magnetic disk, comprising a positioning means for positioning a magnetic head in each of a plurality of servo information write positions by moving the magnetic head to an aimed track in a magnetic disk by a coarse movement stage and to a plurality of servo information write positions in the aimed track by a fine movement stage, and a writing means for writing a plurality of servo information in each of the servo information write positions and similarly a plurality of servo information for a predetermined number of tracks from the aimed track in the respective servo information write positions of the magnetic disk, the positioning means moving the magnetic head to a next aimed track for every predetermined number of tracks by the coarse movement stage and the writing means writing a plurality of servo information in each of a number of tracks of the magnetic disk,
wherein
- the writing means writes a predetermined information in an area which is on a circumference of the magnetic disk corresponding to one of a plurality of servo information write positions in a last track or a track, which is one or two in front of the last track, of a predetermined number of tracks and in which servo information is not written,
- the predetermined information is detected by moving the magnetic head in a radial direction of the magnetic disk by the fine movement stage after the magnetic head is moved to a next aimed track by the coarse movement stage,
- the writing means writes the servo information for the next aimed track using the radial position of the magnetic head, in which the predetermined information is detected, as a reference, and
- the magnetic disk is tested by positioning the magnetic head in a predetermined track.

12. A magnetic disk tester for testing a magnetic disk, according to claim 11, further comprising a control circuit for positioning the magnetic head in the predetermined track by an ON track servo control according to the servo information which is read by the magnetic head, wherein the magnetic disk is tested by positioning the magnetic head in the predetermined track by the control circuit in an ON track servo control.

* * * * *